(12) United States Patent
Poe (10) Patent No.: US 11,169,345 B1
(45) Date of Patent: Nov. 9, 2021

(54) SLIDING TRAY FOR FIBER OPTIC PANEL ASSEMBLY

(71) Applicant: Google LLC, Mountain View, CA (US)

(72) Inventor: Charles Poe, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/889,205

(22) Filed: Jun. 1, 2020

Related U.S. Application Data (60) Provisional application No. 63/022,635, filed on May 11, 2020.

(51) Int. Cl.
*G02B 6/44* (2006.01)

(52) U.S. Cl.
CPC ......... *G02B 6/4453* (2013.01); *G02B 6/4471* (2013.01)

(58) Field of Classification Search
CPC .......................... G02B 6/4453; G02B 6/4471
See application file for complete search history.

(56) References Cited

U.S. PATENT DOCUMENTS

| | | |
|---|---|---|
| 7,418,184 B1 | 8/2008 | Gonzales et al. |
| 8,452,148 B2 * | 5/2013 | Cooke ................. G02B 6/4455 385/135 |
| 8,676,022 B2 | 3/2014 | Jones |
| 8,747,150 B1 | 6/2014 | Lin |
| 9,429,251 B1 | 8/2016 | Lin |
| 9,465,172 B2 | 10/2016 | Shih |
| 9,625,658 B1 | 4/2017 | Lin |
| 10,564,378 B2 | 2/2020 | Cooke et al. |
| 2009/0245743 A1* | 10/2009 | Cote ................... G02B 6/4454 385/135 |
| 2010/0032276 A1 | 2/2010 | Arai |
| 2010/0278498 A1* | 11/2010 | Zimmel ............... G02B 6/2938 385/135 |
| 2011/0267794 A1 | 11/2011 | Anderson et al. |
| 2013/0183018 A1* | 7/2013 | Holmberg ............ G02B 6/3897 385/135 |
| 2014/0003782 A1 | 1/2014 | Blackwell, Jr. et al. |
| 2014/0003783 A1 | 1/2014 | Smrha et al. |
| 2014/0226946 A1 | 8/2014 | Cooke et al. |
| 2016/0327768 A1 | 11/2016 | Xu et al. |
| 2017/0010432 A1 | 1/2017 | Xu et al. |

OTHER PUBLICATIONS

Extended European Search Report for European Patent Application No. 20210632.4 dated May 4, 2021. 9 pages.

* cited by examiner

*Primary Examiner* — Sung H Pak
(74) *Attorney, Agent, or Firm* — Lerner, David, Littenberg, Krumholz & Mentlik, LLP (57) ABSTRACT

A sliding tray that can slide multiple fiber optic modules simultaneously is provided. In one example, a fiber optic panel assembly includes a ceiling, a bottom cover, and two opposing sides defining an interior opening therein, a mounting bracket disposed on the bottom cover in the interior opening, the mounting bracket comprising a plurality of protruding posts extending outward from a supporting structure of the mounting bracket, and a sliding tray having a plurality of protruding structures having a tip end configured to engage with an inner surface of the supporting structure.

19 Claims, 11 Drawing Sheets

SLIDING TRAY FOR FIBER OPTIC PANEL ASSEMBLY

CROSS-REFERENCE TO RELATED APPLICATION

This application claims the benefit of the filing date of U.S. Provisional Patent Application No. 63/022,635 filed May 11, 2020, the disclosure of which is hereby incorporated herein by reference.

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables are connected to a fiber optic module mounted in a panel assembly disposed in a cable management rack located in a data distribution center or a server room. The fiber optic module provides cable-to-cable fiber optic connections and manages the polarity of fiber optic cable connections. The fiber optic module is mounted to a tray that may be further mounted to the panel assembly. The tray may be extended from the panel assembly like a drawer to allow technicians or operators to access to the fiber optic components, connectors, or fiber optic cables connected to the fiber optic module without, removing the fiber optic module from the panel assembly.

Due to the increasing demand of bandwidth, a higher density connection with an increased number of fiber optic components and connectors in the fiber optic module is desired within a given space in the panel assembly. However, such higher density connection often makes it difficult to access the fiber optic components and connectors in the fiber optic modules with multiple trays mounted in the panel assembly in a closely packed arrangement. Conventional tray pull-out configurations often only allow pulling out one tray at a time. Thus, the higher density horizontal connection utilizing the multiple tray arrangement often results in a time-consuming process for the technicians or operators to pull out the trays individually for inspection when needed. Furthermore, the proper organization of the cable connections in the panel assembly in the cable management rack also becomes a difficult task.

BRIEF SUMMARY

A sliding tray that can slide multiple fiber optic modules simultaneously is provided. The sliding tray may be mounted in a fiber optic panel assembly. In one example, the fiber optic panel assembly includes a ceiling, a bottom cover, and two opposing sides defining an interior opening therein, a mounting bracket disposed on the bottom cover in the interior opening, the mounting bracket comprising a plurality of protruding posts extending outward from a supporting structure of the mounting bracket, and a sliding tray having a plurality of protruding structures, each protruding structure having a tip end configured to engage with an inner surface of the supporting structure.

In one example, the mounting bracket includes a plurality of apertures defined between the plurality of protruding posts, wherein the apertures are configured to receive the protruding structures of the sliding tray therein. Each of the plurality of protruding structures of the sliding tray is configured to engage with a fiber optic module. Each of the plurality of protruding structures of the sliding tray comprises a mounting feature configured to secure the fiber optic module engaged therewith.

In one example, the sliding tray further includes a plurality of apertures defined between the plurality of protruding structures, wherein the apertures are configured to receive the protruding posts of the mounting bracket. Each of the protruding structures of the sliding tray is configured to abut against and interleaved with the respective protruding post from the mounting bracket. The sliding tray further includes a guiding rail formed at edges of the sliding tray. The mounting bracket further includes a tray channel formed in the protruding post configured to engage with the guiding rail from the sliding tray.

In one example, the sliding tray further includes a pull tab formed on a side of the sliding tray. The tray channel formed in the protruding post further includes a stop member disposed in the tray channel. Each of the plurality of protruding posts of the mounting bracket is configured to engage with a fiber optic module.

In one example, the ceiling further includes a front top cover and a rear top cover defining the ceiling. A plurality of fiber optic modules is configured to engage with the protruding posts and the protruding structures. The fiber optic modules is vertically disposed in the interior opening in an array configuration. Each of the fiber optic module is configured to have adaptors vertically stacked therein. The adaptors are dual polarity adaptors.

Another aspect of the disclosure provides a fiber optic panel assembly having a ceiling, a bottom cover, and two opposing sides defining an interior opening therein, and a sliding tray disposed in the interior opening, the slidable tray configured to have a plurality of fiber optic modules vertically disposed in the sliding tray, wherein the sliding tray is configured to pull out selected fiber optic modules while maintaining non-selected fiber optic modules unmoved, wherein every other fiber optic module is staggered with respect to an adjacent fiber optic module disposed in the interior opening.

In one example, a pull tab is attached to a side of the sliding tray. The selected fiber optic modules is engaged with the sliding tray and the non-selected fiber optic modules is engaged with a mounting bracket disposed in the interior opening.

Another aspect of the disclosure provides a cable management system including a fiber optic panel assembly disposed in a cable management system. The fiber optic panel assembly further includes a sliding tray disposed in an interior opening of the fiber optic panel assembly, the slidable tray configured to have a plurality of fiber optic modules vertically disposed in the sliding tray, wherein the sliding tray is configured to pull out selected fiber optic modules while maintaining non-selected fiber optic modules unmoved, wherein every other fiber optic module is staggered with respect to an adjacent fiber optic module disposed in the interior opening.

In one example, the fiber optic panel assembly is mounted on a rack in the cable management system.

DETAILED DESCRIPTION

This disclosure provides a fiber optic panel assembly for fiber optic interconnection. The fiber optic panel assembly provides a sliding tray that can slide selected fiber optic modules outward from other non-selected fiber optic modules disposed in the fiber optic panel assembly. Each fiber optic module is disposed vertically side by side in a multiple array configuration in the fiber optic panel assembly. In one example, every other fiber optic module, such as a first set of fiber optic modules, is staggered in a longitudinal direction from a front end to a rear end of the fiber optic module, with respect to an adjacent fiber optic module, such as a second set of fiber optic module. For example, the first set of fiber optic module is disposed rearwardly at a depth from the second set of the fiber optic module. The sliding tray may selectively pull out the first set or the second set of the fiber optic module outwardly relative to the other set so as to allow the technicians or operators to access to the fiber optic connectors in the fiber optic module with ease and reduced interference from the adjacent connectors. Furthermore, the sliding tray is also configured to pull out multiple selected fiber optic module simultaneously at one time so that a technician or an operator may visually identify and locate a target connector or cable in the fiber optic panel assembly efficiently and quickly with minimum search time. As the fiber optic modules are vertically disposed side by side in a closely packed arrangement, good utilization of the space defined in the fiber optic panel assembly may be obtained. Thus, the fiber optic module assembly disclosed herein provides a high density, ease and quick of access, and a small footprint for the desired cable and connector management and organization.

Figure 1A:
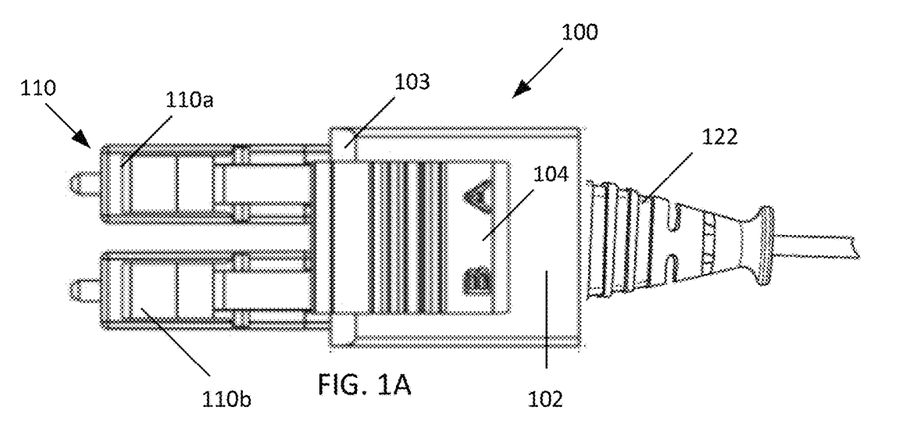
FIGS. 1A-1C depicts an example of a fiber optic connector according to aspects of the disclosure.
Figure 1B:
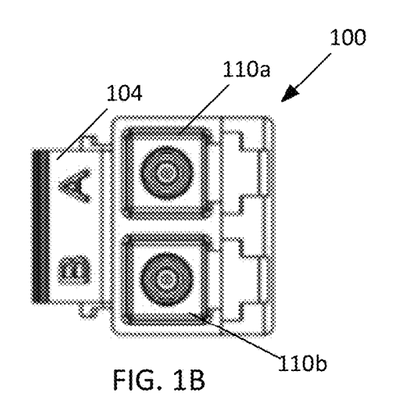
Figure 1C:
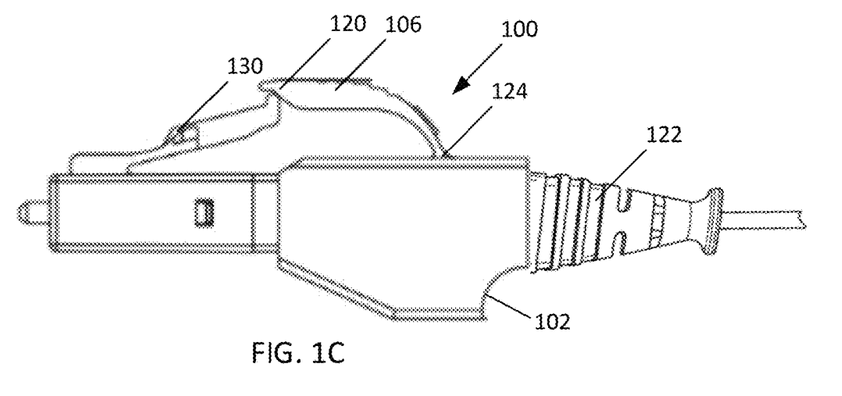

FIGS. 1A-1C depict an example of a fiber optic connector 100 that provides dual polarity configurations. FIG. 1A depicts a top view of the fiber optic connector 100. The fiber optic connector 100 comprises a body 102 that has two connector assemblies 110 (shown as 110a, 110b) connected thereto.

FIG. 1B depicts a front view of the fiber optic connector 100 illustrating the two connector assemblies 110 (shown as 110a, 110b) formed at a front section 103 of the fiber optic connector 100. Connector polarity indicia 104 is formed in the body 102 that indicates the polarity of the connector 100. The body 102 encases two optic fibers connecting to the two connector assemblies 110a, 110b respectively. The two optic fibers enclosed in the body 102 are connected to a cable 122 connected to the body 102.

FIG. 1C depicts a side view of the fiber optic connector 100. A latch 106 has a first end 120 connected to the connector assemblies 110a, 110b through a spring latch arm 130 and a second end 124 connected to the body 102. The latch 106 is used to secure the fiber optic connector 100 to an adaptor. The spring latch arm 130 releasably engages the latch 106. The spring latch arm 130 may be pressed to disengage from the latch 106. When the spring latch arm 130 is released and disengaged from the latch 106, the connector assemblies 110a, 110b may be inserted into an adapter in a predetermined insertion direction. The adaptor may be disposed in a fiber optic module (not shown) mounted in a fiber management system. The latch 106 abuts against the spring latch arm 130 connected to the connector assemblies 110a, 110b for manually pressing the latter to move downwardly to allow disengagement between the connector assemblies 110a, 110b and the adapter and removal of the connector assemblies 110a, 110b out of the port. When a reversal of the polarity configuration is desired, the spring latch arm 130 may be pressed to discharge the connector assemblies 110a, 110b from the body 102. The connector assemblies 110a, 110b may then be flipped and rotated for 180 degrees for polarity reversal and the latch 106 will then be re-attached to the opposite site of the body 102. Details of the adaptor that may be utilized to mate with the fiber optic connector 100 with dual polarity is illustrated below in detail with references to FIGS. 2A-2B.

Figure 2A:
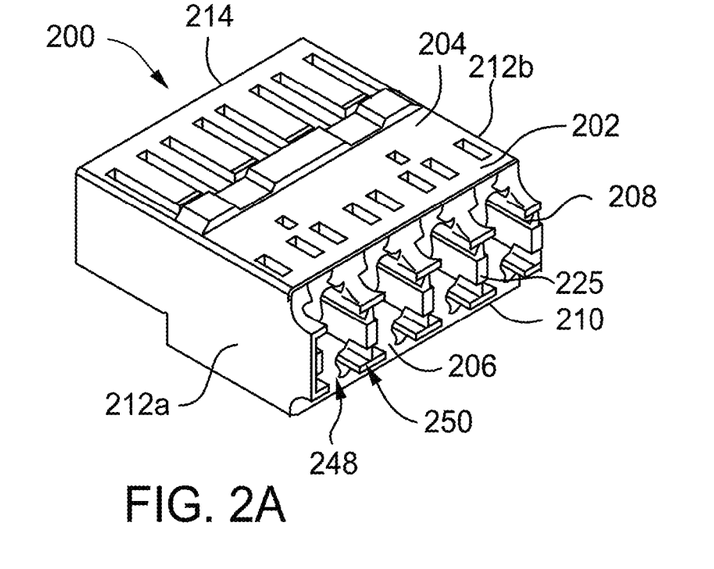
FIGS. 2A-2B depicts an example of an adaptor module according to aspects of the disclosure.
Figure 2B:
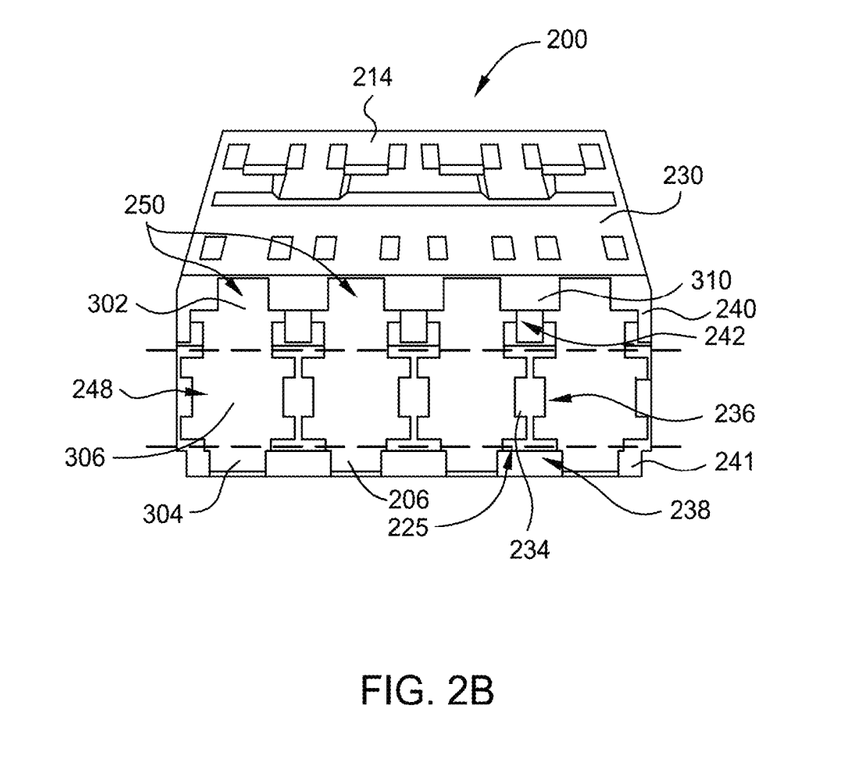

FIGS. 2A-2B depict a perspective view and a front view, respectively, of an adaptor module 200 that may be mounted in a fiber optic panel assembly 700, which will be described later below with reference to FIG. 7. The adaptor module 200 includes a plurality of adaptors 250. The adaptor 250 is a dual polarity adaptor that may accommodate different orientations and geometrical configurations of the fiber optic connector 100 with different polarity configurations. In the example depicted in FIG. 2A, the adaptor module 200 includes four adaptors 250 connected together, such as in a line or stack, so as to save space and maximize the usage of the space among the adaptors 250. It is noted that the adaptor module 200 may have any numbers of the adaptors 250, such as at least one, at least two, at least three, at least four, at least five, at least six, or other numbers, as needed for different configurations of the patch panel on where the adaptor module 200 is configured to be mounted. It is noted that the density of fiber interconnection may be maximized by utilizing multiple adaptor modules 200 to be disposed side-by-side with multiple arrays. In this manner, the adaptor modules 200 are abutting one another in adjacent rows and adjacent columns, thus eliminating wasted space from between adjacent rows and adjacent columns, and providing a maximum density of connection adaptors 250 for the available opening space in the patch panel. In one example, the adaptor module 200 may be configured with any angular configuration to provide any connection orientation angle with respect to the patch panel.

The adaptor 250 is configured to mate with a fiber optic connector, such as the fiber optic connector 100 depicted in FIGS. 1A-1C with different polarity configurations. It is noted that the adapter 250 may be mated with other types of the fiber optic connector as needed when the geometric configurations of the fiber optic connector can fit in the slot and/or ports defined in the adaptor 250.

In one example depicted in FIG. 2A, the adaptor module 200 includes a housing 202 having a top wall 204, a bottom wall 210, a first sidewall 212a, and a second sidewall 212b connecting the top wall 204 and the bottom wall 210. The top wall 204, the bottom wall 210, the first and second sidewall 212a, 212b define an interior region 206, such as a passage. The interior region 206 of the housing 202 is divided by a plurality of partition walls 225, defining multiple adaptors 250 with multiple connector connection ports 248 therein. The partition wall 225 is connected from the top wall 204 to the bottom wall 210. Each connector connection port 248 is configured to receive a fiber optic connector, such as the fiber optic connector 100 depicted in FIG. 1A-1C. Each adaptor 250 defined in the adaptor module 200 may be symmetrically identical, and the first and second sidewalls 212a, 212b may also be symmetrically identical, such that upon rotation of the adaptor module 200 along with its longitudinal axis, the tops and bottoms are interchangeable.

The adaptor 250 may serve as a termination point between an incoming fiber optic cable connected through a rear section 214 of the adaptor module 200 and an outgoing fiber optic cable, such as the cable 122, connected through the fiber optic connector 100.

Although the example depicted herein has four adaptors defined in an adaptor module, it is noted that the numbers of the adaptors formed, configured in, or connected to form an adaptor module may be in any numbers as needed.

The top wall 204, the bottom wall 210, the first and second sidewalls 212a, 202b of the housing 202 as well as the partition walls 225 may be integrally formed as an integral body from a polymeric material, such as molded plastic.

FIG. 2B depicts a front top view the adaptor module 200 that includes four adaptors 250. The partition wall 225 positioned in the interior region 206 defines the connector connection ports 248 in the adaptor 250. Each partition wall 225 has three portions, a first portion 242 and a second portion 238 with a center portion 236 sandwiched therebetween. The first portion 242 formed in each partition wall 225 horizontally defines a first slot 302 and the second portion 238 formed in each partition wall 225 horizontally defines a second slot 304 while the center portion 236 horizontally defines a center slot 306, as shown in the dotted lines, in the connector connection ports 248. The center slot 306 is configured to receive the connector assemblies 110 from the fiber optic connector 100 while the first slot 302 and the second slot 304 are configured to receive the latch 106 from the fiber optic connector 100. In one example, when the fiber optic connector 100 is in a standard polarity configuration, the latch 106 may be engaged with the first slot 302. In contrast, in a reversed polarity configuration, the position of the latch 106 may be rotated for 180 degrees relative to the position of the latch 106 in a standard or straight polarity configuration. In this regard, the latch 106 may be then engaged with the second slot 304 instead in light of the rotation of the fiber optic connector 100.

In other examples, when standard polarity is configured to have the latch 106 positioned downward, the latch 106 may be engaged in the second slot 304 while the connector assemblies 110 are engaged with the center slot 306. In contrast, when reversed polarity is configured to have the latch 106 flipped-oppositely and positioned upward, the latch 106 may be engaged in the first slot 302 while the connector assemblies 110 are engaged with the center slot 306. A marking section 310 may be formed either at an upper end of the partition wall 225, such as in the first portion 242, or at a lower end of the partition wall 225, such as in the second portion 238, or other suitable places to provide a bold visual indication to the technician of the polarity configurations. In the example depicted in FIG. 2B, the marking section 310 indicates standard polarity of the fiber optic connector 100 when the latch 106 is engaged with the first slot 302. It is noted that the marking section 310 may be formed at different locations of the adapter 250 as needed to facilitate indication of polarity configurations for the technician and operator.

Thus, by configuring the connector connection port 248 with the first slot 302 and the second slot 304 formed adjacent to or connected to the center slot 306, the fiber optic connector 100 with different polarity configurations may be easily installed and inserted into the adaptor 250 without additional direction changes, orientation alternation, or rotation flip either to the fiber optic connector or to the adaptor. When the fiber optic connector 100 is flipped oppositely for polarity change, the two additional slots, such as the first and the second slots 302, 304, formed laterally to the center slot 306, may accommodate different orientations and geometrical configurations of the fiber optic connector 100. Accordingly, the labor and cost for fiber optic management is reduced and the footprint required to place adaptors with different polarity configurations may be reduced.

Figure 3A:
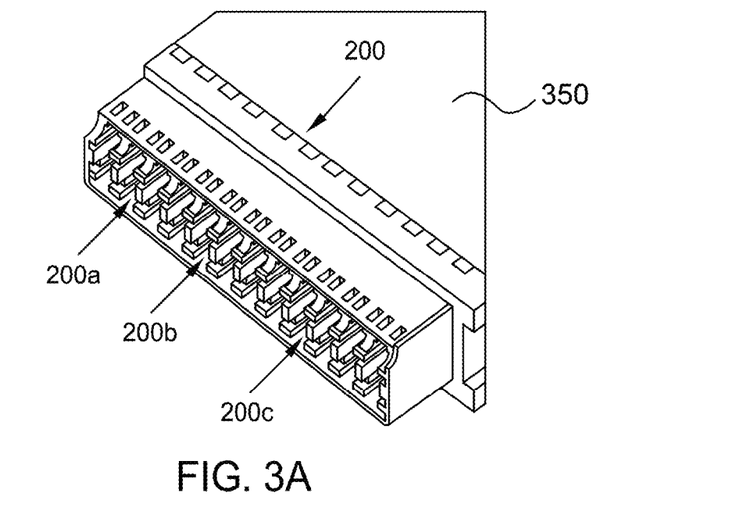
FIGS. 3A-3B depicts an example of a front view and a back view of an adaptor module of FIG. 2A-2B with fiber optic connector connected to the adaptor according to aspects of the disclosure.
Figure 9A:
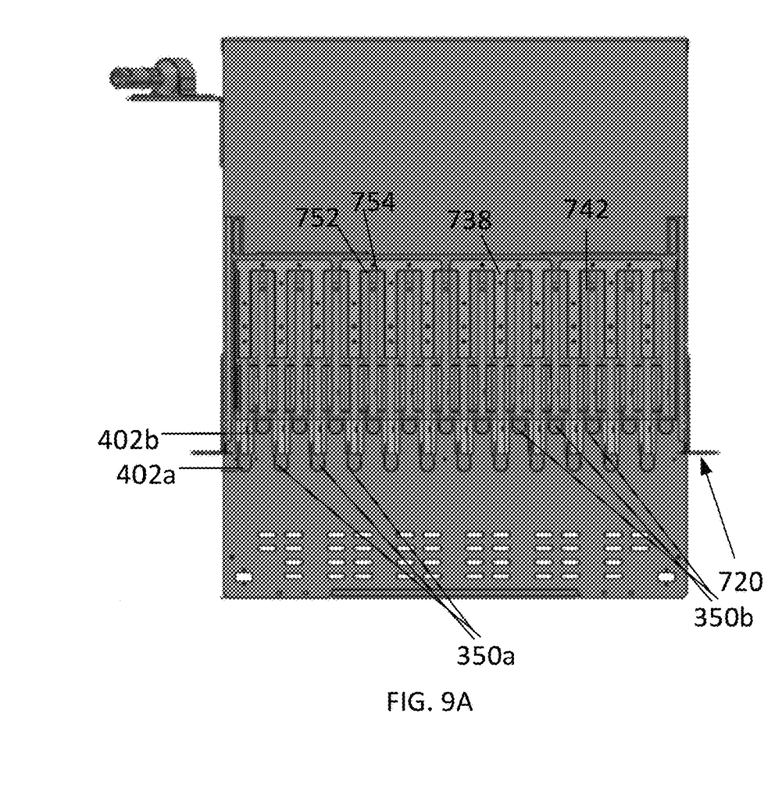
FIGS. 9A-9B depict a top perspective view of the sliding tray of FIG. 8 in a non-extended position and an extended position, respectively, disposed in the fiber optic panel assembly of FIG. 8 according to aspects of the disclosure.

FIG. 3A depicts an example of the adaptor modules 200 positioned in a fiber optic module 350. In the example depicted in FIG. 3A, the fiber optic module 350 is configured to receive multiple adaptor modules 200, shown as 200a, 200b, 200c, aligned in a linear configuration. The fiber optic module 350 may be mounted inside the fiber optic panel assembly 700 (as shown in FIG. 7) in a vertical configuration. The fiber optic module 350 may be disposed in a tray 900 (as shown in FIG. 9) that may be extendable and slidable from the fiber optic panel assembly 700 like a drawer to allow technicians access to the adaptor 250 provided by the adaptor module 200 and any fiber optic cables or connectors connected to the adaptors 250 without removing the adaptor module 200 from the fiber optic panel assembly 700. In the example depicted in FIG. 3A, three adaptor modules 200a, 200b, 200c are mounted in the fiber optic module 350, thus in total providing twelves adaptor ports 248 in one fiber optic module 350. It should be understood that in other examples the number of adapters and/or adaptor ports may be varied. It is noted that multiple fiber optic modules 350 may be connected side by side, end to end, in multiple arrays or columns, or any suitable configurations as needed.

Figure 3B:
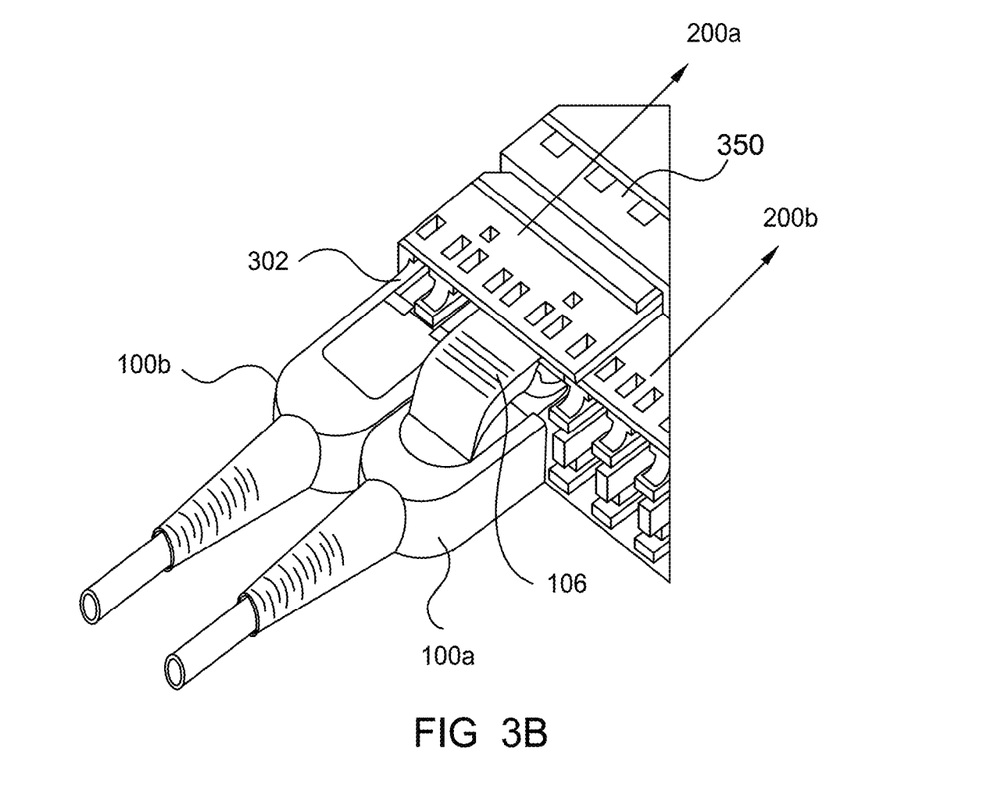

FIG. 3B depicts an example of the two fiber optic connectors 100a, 100b with different polarity configurations connected to the adaptor modules 200a mounted in the fiber optic module 350. As both the first and the second slots 302, 304 are defined in the adaptor 250, the two fiber optic connectors 100 with different polarity, such as the first fiber optic connector 100a with the latch 106 positioned upward from the housing and the second fiber optic connector 100b with the latch 106 positioned downward from the housing (not shown in FIG. 4B), may be both engaged in the adaptor module 200 through the first slot 302 and the second slot 304 formed in the adaptor 250.

Figure 4:
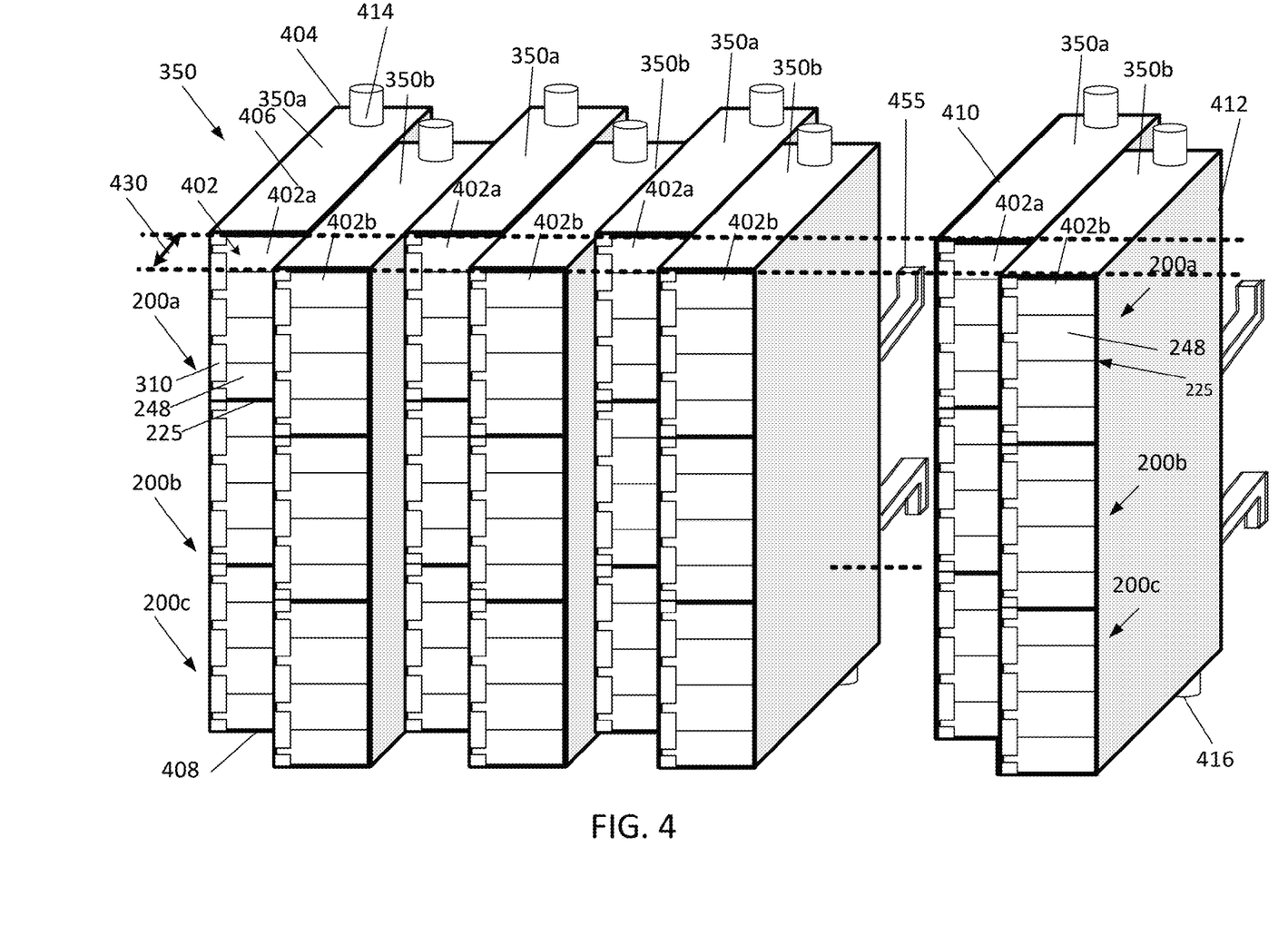
FIG. 4 depicts an example of an array of fiber optic modules according to aspects of the disclosure.

FIG. 4 depicts a plurality of the fiber optic module 350 (shown as 350a, 350b) disposed side by side in an array and vertical configuration. The plurality of the fiber optic module 350 may be further placed and mounted into the fiber optic panel assembly 700 as shown in FIGS. 7 and 8. In the example depicted in FIG. 4, each fiber optic module 350 may include three adaptor modules 200a, 200b 200c mounted therein. As discussed above, the partition walls 225 define four connector connection ports 248 in each adaptor modules 200a, 200b 200c. The first, center and second slots defined in the connector connection ports 248 is not shown and is eliminated in this example for ease of description. The marking section 310 is formed on one side of the partition wall 225 to provide a visual indication of the polarity configurations.

The fiber optic module 350 has a front end 402, a back end 404 and two flat opposing sides 410, 412. A top edge 406 and a bottom edge 408 are connected among the front end 402, the back end 404 and the opposing sides 410, 412. Catches 414, 416 are formed on the top edge 406 and the bottom edge 408 respectively for securing the fiber optic module 350 to a mounting feature (such as the mounting feature 790 depicted in FIG. 10B) from the fiber optic panel assembly 700. The catches 414, 416 are a protrusion having a round shape and have a corresponding shaped portion located in the mounting feature from the fiber optic panel assembly 700 to enable engagement therewith. Consequently, the fiber optic module 350 is slid within the fiber optic panel assembly 700 upon installation until the catch 414, 416 aligns with and is seated within a corresponding portion of the mounting feature from the fiber optic panel assembly 700, thus inhibiting inadvertent removal of the fiber optic module 350 from the fiber optic panel assembly 700. In one example, the catches 414, 416 are vertically aligned across the body of the fiber optic module 350.

In one example, a pair of finger hooks 455 is provided and disposed on the back end 404 of the fiber optic module 350 so as to allow easy grabbing of the respective fiber optic module 350 from the arrays.

In one example, every other fiber optic module 350 is staggered in a front end to a back end direction, such as a horizonal direction, with respect to an adjacent fiber optic module 350. The staggering of the fiber optic module 350 alternates across the arrays formed among the fiber optic module 350. In one example, a vertical surface of a first front end 402 of a first set of the fiber optic module 350, such as the first front end 402a of the fiber optic module 350a in odd numbers including a first, third and fifth fiber optic module and so on, are aligned. In contrast, a second vertical surface of the second front end 402 of a second set of the fiber optic module 350, such as the second front end 402b of the fiber optic module 350b in even numbers including a second, fourth and sixth fiber optic module and so on, are aligned. It is noted that the numbering of the fiber optic module 350 is started from a leftmost fiber optic module 350 disposed in the array, when viewing the array from the front end 402 of the fiber optic modules 350. Accordingly, the leftmost fiber optic module 350 is considered as the first fiber optic module, such as a first odd number fiber optic module. Thus, the fiber optic module abuts the leftmost fiber optic module 350 is considered as the second fiber optic module, such as a first even number fiber optic. The numbering of the fiber optic module continues until a desired number of the fiber optic modules is reached to form the array. In one example, the array may include 12 fiber optic modules, with a first fiber optic module disposed as the leftmost fiber optic module in the array and a twelfth fiber optic module disposed as the rightmost fiber optic module in the array. In one example, the first set of the fiber optic module 350a includes odd number fiber optic modules in the array while the second set of the fiber optic module 350b includes even number fiber optic modules.

The first front end 402a of the first set of fiber optic module 350a and the second end 402b of the second set of the fiber optic module 350b are configured to be staggered in a front end to rear end direction at a depth 430. In other words, the second set of the fiber optic module 350b extends outwardly from the first set of fiber optic module 305b at the predetermined depth 430 so as to provide ample room to expose the connectors disposed in the fiber optic module 350 with relatively easy access for the technician to remove or install connectors as needed. Although the example in FIG. 4 shows the second set of the fiber optic module 350b extended and protruded outward from the first set of fiber optic module 305a, it is noted that the protrusion of the set of the fiber optic module may be in different arrangements, such as the first set of fiber optic module 350a extends outward from the second set of the fiber optic module 350b instead. In one example, the depth 350 may be between about 1 mm and about 500 mm.

In one example, the array of the first and the second set of fiber optic module 350a, 350b may be arranged in a predetermined staggering manner. For example, the first set of fiber optic module 350a may extend outward from the second set of fiber optic module 350b, or vise versa, when positioned into the fiber optic panel assembly 700. The rail channel and the sliding tray disposed in the fiber optic panel assembly 700 is configured to slide out a predetermined set of fiber optic module 350 with multiple fiber optic modules 350, such as the first set of fiber optic modules 350a with all odd number fiber optic module or the second set of fiber optic module 350b with all even number fiber optic module. Thus, access of multiple connectors disposed in the fiber optic module at a time provides an efficient operation for technician and/or the operator to inspect multiple connectors and/or cables in the fiber optic module simultaneously. Furthermore, the staggering configuration between the first and the second set of the fiber optic module 350a, 350b also allows the technician and/or the operator to easily install the connectors and/or cables in the fiber optic module with ample room, thus reducing unwanted removal of an adjacent connector. Thus, installation efficiency is enhanced and operating cost is reduced.

Figure 5:
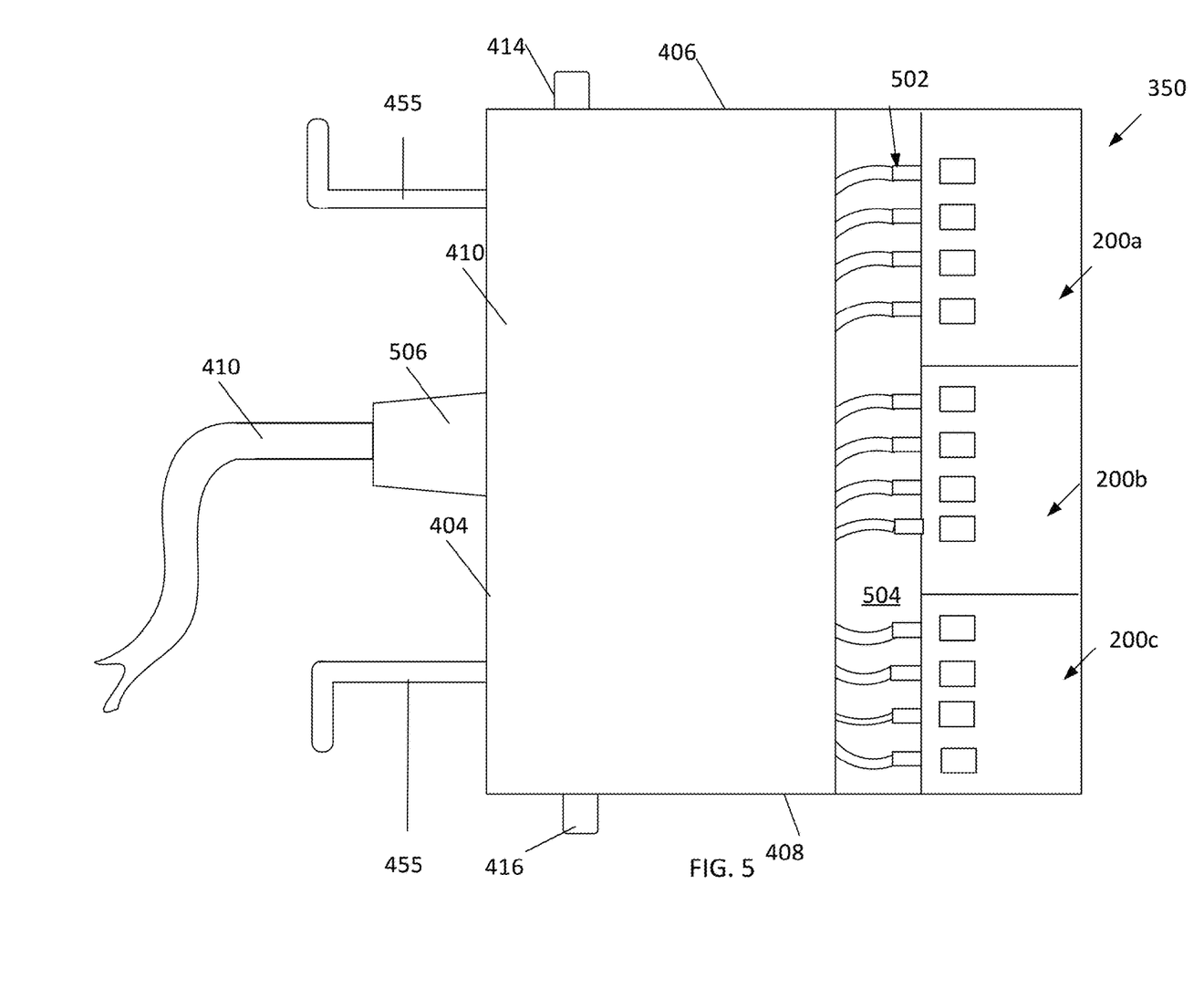
FIG. 5 depicts an example of a side view of a fiber optic module of FIG. 4 according to aspects of the disclosure.

FIG. 5 depicts a side view of the fiber optic module 350 of FIG. 4. A plurality of cables 502 each connects to a respective fiber optic connector through the adaptors in each adaptor modules 200a, 200b, 200c. It is noted that a portion 504 of the side 410 utilized to enclose the adaptor modules 200a, 200b, 200c and the cables 502 is cut off in FIG. 5 to show how the cables 502 are positioned in the interior opening defined in the fiber optic module 350 under the side 410. The plurality of cables 502 may be collected in an optic fiber ribbon 506 through an adaptor 506 or a connector for further connection. The catches 414, 416 are disposed on the top edge 406 and the bottom edge 408 respectively. The pair of the finger hooks 455 is provided and disposed on the back end 404 of the fiber optic module 350 to grab and pull the fiber optic module 350 for installation or uninstallation to and from the fiber optic panel assembly 700.

Figure 6:
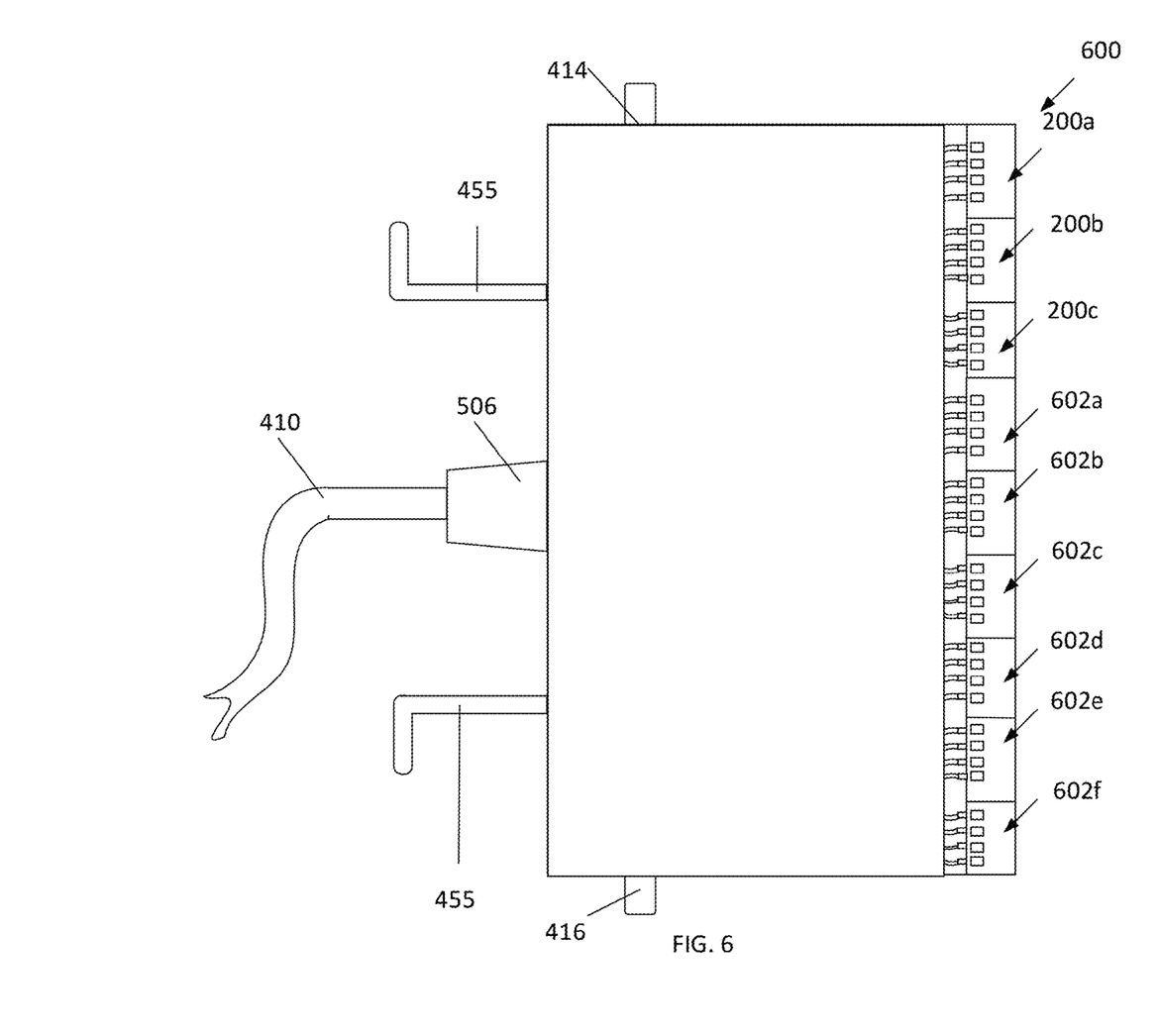
FIG. 6 depicts another example of a side view of a fiber optic module according to aspects of the disclosure.

FIG. 6 depicts a side view of another example of a fiber optic module 600.

In this example, more than three adaptor modules 200a, 200b, 200c may be disposed in the fiber optic module 600. In the example depicted in FIG. 6, nine adaptor modules 200a, 200b, 200c, 602a, 602b, 602c, 602d, 602e, 602f, in total are disposed in the fiber optic module 600. As each adaptor module 200*a*, 200*b*, 200*c*, 602*a*, 602*b*, 602*c*, 602*d*, 602*e*, 602*f* has four adaptor ports to receive connectors, the fiber optic module 600 depicted in FIG. 6 may accommodate thirty six connectors (e.g., 4×9=36) connected thereto as needed. In this configuration, when a high number of the connectors are required in a fabric optic cable management system, the closely packed adaptor modules 200*a*, 200*b*, 200*c*, 602*a*, 602*b*, 602*c*, 602*d*, 602*e*, 602*f*, such as stacking up vertically top to end, as depicted in FIG. 6, can provide connector connection with high density.

Figure 7:
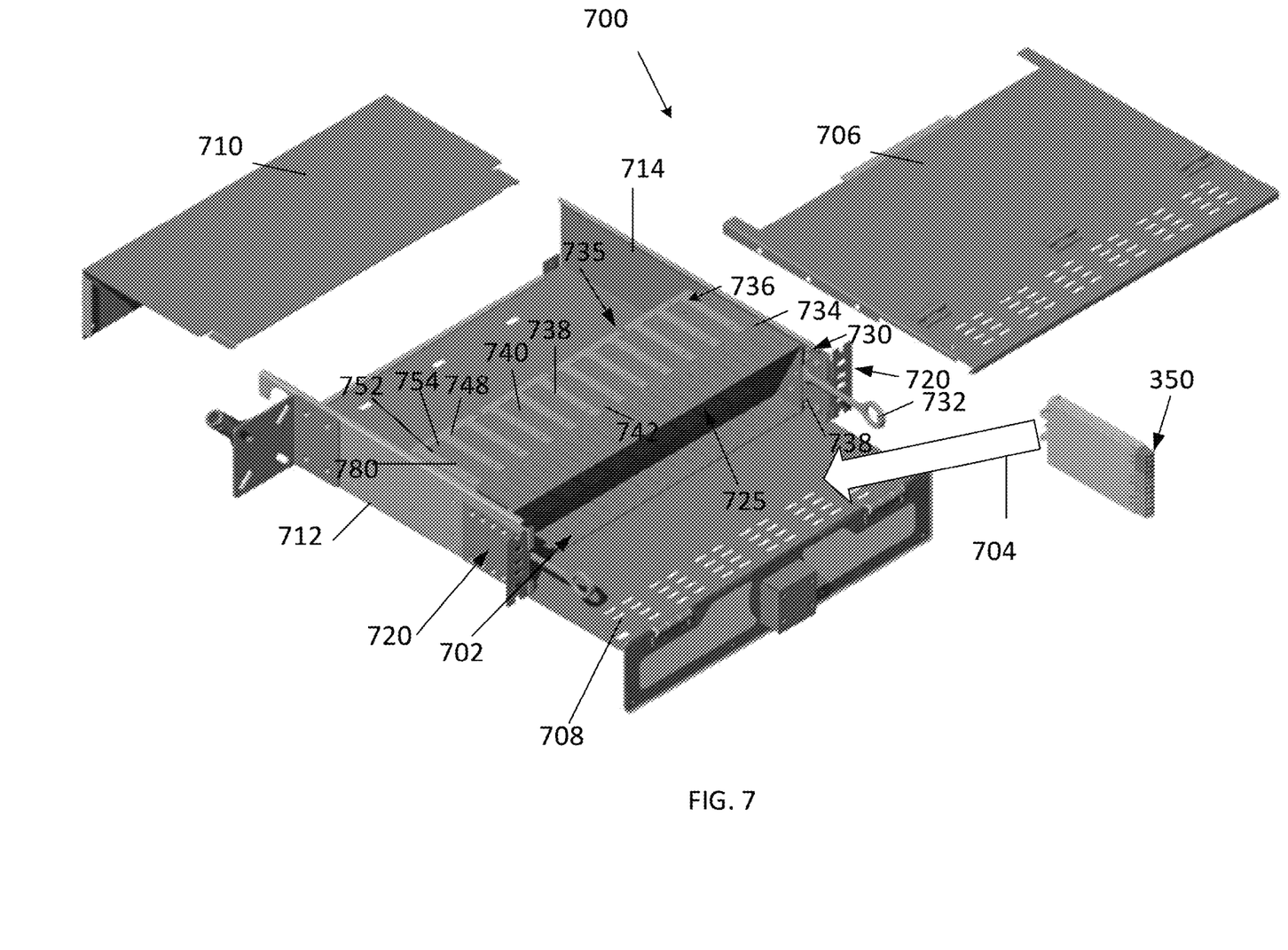
FIG. 7 depicts a top exploded view of an example of a fiber optic panel assembly that may accommodate the fiber optic module of FIG. 4 according to aspects of the disclosure.
Figure 8:
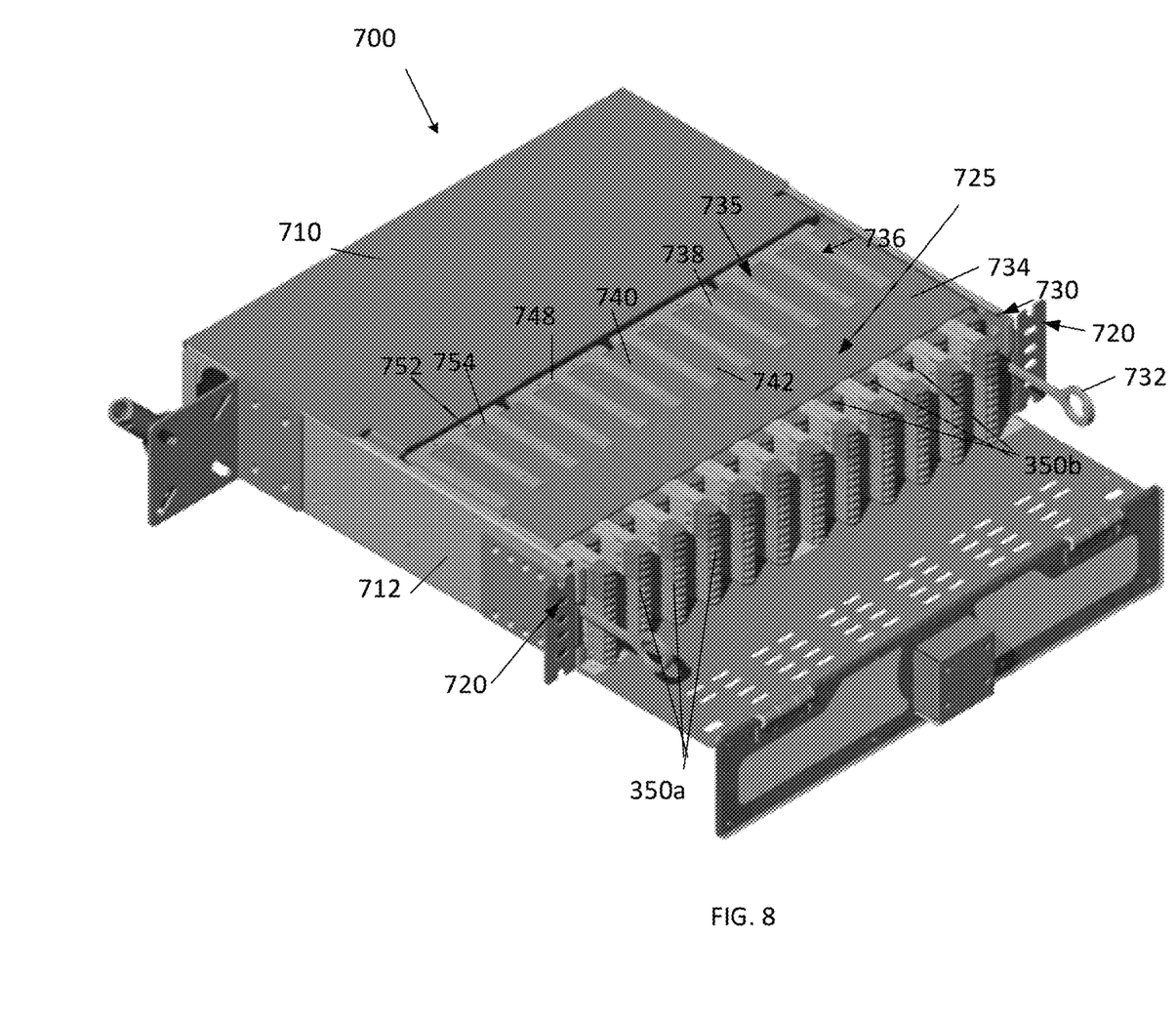
FIG. 8 depicts a top front end view of the fiber optic panel assembly of FIG. 7 with multiple arrays of fiber optic modules mounted therein according to aspects of the disclosure.

FIG. 7 depicts a top exploded view of an example of a fiber optic panel assembly 700. The fiber optic panel assembly 700 may accommodate the fiber optic module 350 of FIGS. 4 and 5 to be disposed in an interior opening 702, as shown by the arrow 704, defined in the fiber optic panel assembly 700. It is noted that when the high density fiber optic module 600 of FIG. 6 is configured to be installed in the fiber optic panel assembly 700, the dimension of the fiber optic panel assembly 700 may be proportionally increased to accommodate the high density fiber optic module 600 of FIG. 6 with the larger dimension.

The fiber optic module 350 is disposed vertically in the interior opening 702 relative to a horizonal plane defined by a top front cover 706 or a bottom cover 708 of the fiber optic panel assembly 700. The top front cover 706 and a top rear cover 710 in combination define a top ceiling of the fiber optic panel assembly 700. Two opposing side panels 712, 714 are disposed in parallel connected between the top front cover 706, the top rear cover 710 and the bottom cover 708, defining the interior opening 702 therein. A mounting structure 720 may be disposed on the side panels 712, 714 that can assist mounting the fiber optic panel assembly 700 to a cable management system, such as a cable rack located in a server room or a data center.

A sliding (or extendable) tray 725 may be mounted in the interior opening 702 of the fiber optic panel assembly 700. The sliding tray 725 may carry a plurality of fiber optic module 350 so as to slide or pull a predetermined set of the fiber optic module 350 outwardly relative to the fiber optic panel assembly 700. The sliding tray 725 has a front housing 734 configured to slide in and engage with a rail channel 730 defined in the side panels 712, 714 of the fiber optic panel assembly 700. A pull tab 732 is formed on sidewalls 738 of the front housing 734 to provide a gripping structure to allow the sliding tray 725 to easily be pulled out from and pushed into the fiber optic panel assembly 700.

A mounting bracket 736 is disposed on the bottom cover 708 having a rear housing 735 in the fiber optic panel assembly 700. The mounting bracket 736 has a plurality of protruding posts 738 and a plurality of apertures 740 therebetween. The plurality of the protruding posts 738 extends from an inner surface 752 of a supporting structure 748. The plurality of apertures 740 is defined against and above the inner surface 752 of the supporting structure 748. A space defined in the rear housing 735 under each of the protruding posts 738 of the mounting bracket 736 is configured to encase one fiber optic module 350 therein.

The plurality of apertures 740 of the mounting bracket 736 may receive a plurality of protruding structures 742 of the sliding tray 725, allowing the sliding tray 725 to engage with the mounting bracket 736 when the sliding tray 725 is retracted in a non-extended position. The plurality of protruding posts 738 may include tray channels 780 (also shown in FIG. 9B) configured to receive the plurality of protruding structures 742 of the sliding tray 725 slid therein. A tip end 752 of the protruding structures 742 of the sliding tray 725 abuts the inner surface 752 of the mounting bracket 736. When retracted in the non-extended position, each of the protruding structures 742 of the sliding tray 725 abuts against and is interleaved with the respective protruding post 738 from the mounting bracket 736 with the tip end 752 mating with the inner surface 752. A space in the front housing 734 defined under each of the protruding structures 742 of the sliding tray 725 is configured to encase one fiber optic module 350 vertically disposed therein. Accordingly, the plurality of the protruding posts 738 of the mounting bracket 736 encases a first set of fiber optic module 350, such as a first, third, fifth fiber optic modules 350 (the odd number fiber optic modules 350*a* as shown in FIG. 4) and so on while the plurality of protruding structures 742 of the sliding tray 725 encases a second set of fiber optic module 350, such as a second, fourth, sixth fiber optic modules 350 (the even number fiber optic modules 350*b* as shown in FIG. 4) and so on. Thus, the first set of fiber optic module 350*a* encased under the protruding posts 738 of the mounting bracket 736 and the second set of fiber optic module 350*b* encased under the protruding structures 742 of the sliding tray 725 are disposed against each other, but connected to different elements, such as the mounting bracket 736 and the sliding tray 725 respectively. When the sliding tray 725 is slid and pulled outwardly to an extended position, only the second set of the fiber optic module 350*b* connected to the sliding tray 725 is pulled out, leaving the first set of the fiber optic module 350 remained at the non-extended position.

In one example, the mounting bracket 736 may be fixedly mounted in the fiber optic panel assembly 700 by fastening features, such as bolts and nuts, screw fasteners and the like.

FIG. 8 depicts a top front end view of the fiber optic panel assembly 700 of FIG. 7 with multiple arrays of fiber optic modules 350*a*, 350*b* mounted therein in a non-extended position. As described above, the first set of the fiber optic modules 350*a* and the second set of the fiber optic modules 350*b* are disposed in a staggering manner that the first and the second set of the fiber optic modules 350*a*, 350*b* are staggered at a depth relative to each other. In the example depicted in FIG. 8, the first set of the fiber optic modules 350*a* is extended and protruded outward and forward from the second set of the fiber optic modules 350*a* at the predetermined depth. The first set of the fiber optic modules 350*a* is engaged under the plurality of protruding posts 738 of the mounting bracket 736 respectively while the second set of the fiber optic modules 350*b* is engaged under the plurality of protruding structures 742 of the sliding tray 725 respectively. When the pull tab 732 is pulled by a technician or an operator, the second set of the fiber optic modules 350*b* engaged under the plurality of protruding structures 742 of the sliding tray 725 are being pulled out, extending the sliding tray 725 outward to an extended position while the first set of the fiber optic modules 350*a* remains unmoved in the un-extended position.

Figure 9B:
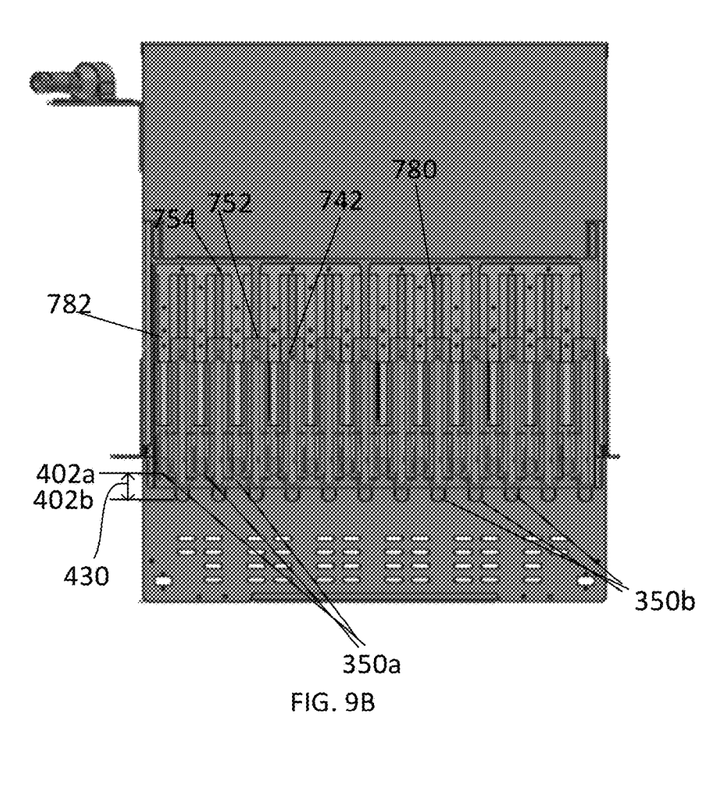

FIGS. 9A and 9B depicts top views of the fiber optic panel assembly 700 with the sliding tray 725 in an un-extended position and in an extended position respectively. In the non-extended position depicted in FIG. 9A, the tip end 752 of the protruding structures 742 abuts and engages with the inner surface 754 of the mounting bracket 736, which is also shown in FIG. 8. The first front end 402*a* of the first set of the fiber optic modules 350*a* is extended outward from the second front end 402*b* of the second set of the fiber optic modules 350*b*. When the sliding tray 725 is pulled out into an extended position as depicted in FIG. 9B, the second set of the fiber optic modules 350*b* becomes extended outwardly from the first set of the fiber optic modules 350*a* with the predetermined depth 430. When in the extended position, the tip end 752 of the protruding structures 742 is pulled out into a position away from the inner surface 754 of the mounting bracket 736. A stopping member 782 may be disposed in the tray channel 780 in the mounting bracket 736 or to edge of the protruding structures 742 of the sliding tray 725 to prevent the sliding tray 725 from extending over the stopping member 782 and outside of tray channel 780 defined in the mounting bracket 736. The sliding tray 725 carries the second set of the fiber optic modules 350b, allowing the multiple connectors disposed in the second set of the fiber optic modules 350b to be pulled out simultaneously at one time, thus avoiding search time for a particular connector connected at a particular fiber optic module in the fiber optic panel assembly 700. Furthermore, the staggering configuration defined between the first and the second set of the fiber optic modules 350a, 350b may also provides an open space, defined by the depth 430, to allow an easy access for the technician and operator to connect or remove the connectors thereof.

Figure 10A:
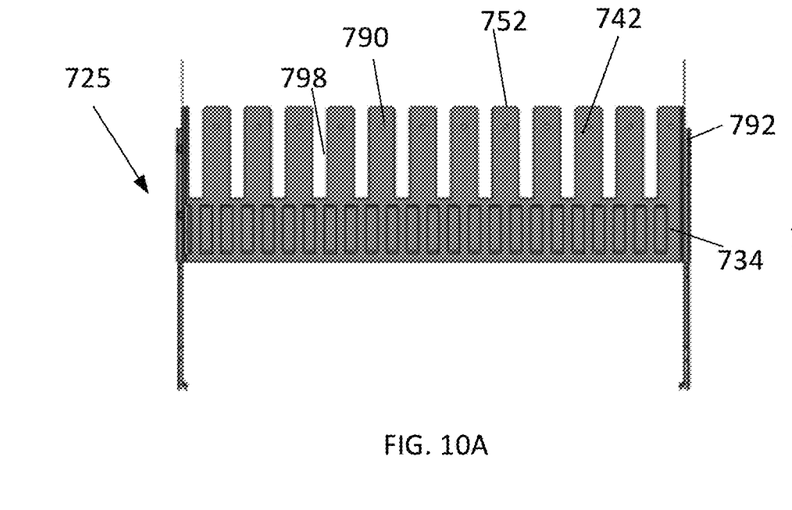
FIGS. 10A-10C depict a top view, a perspective view and a side view of a sliding tray that may be mounted in the fiber optic panel assembly of FIG. 7 according to aspects of the disclosure.
Figure 10B:
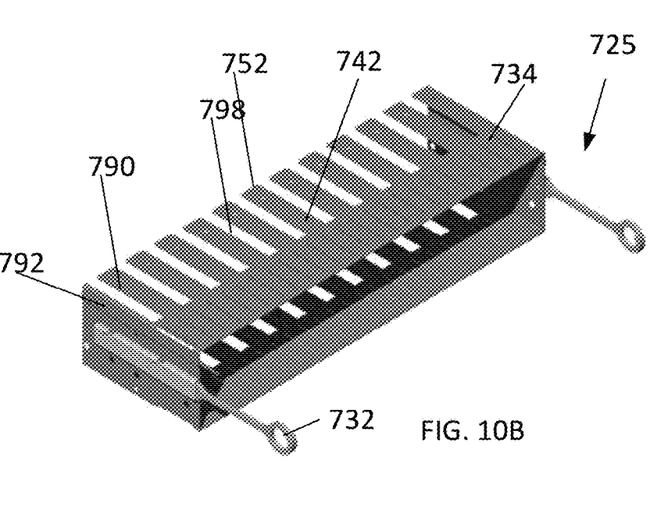
Figure 10C:
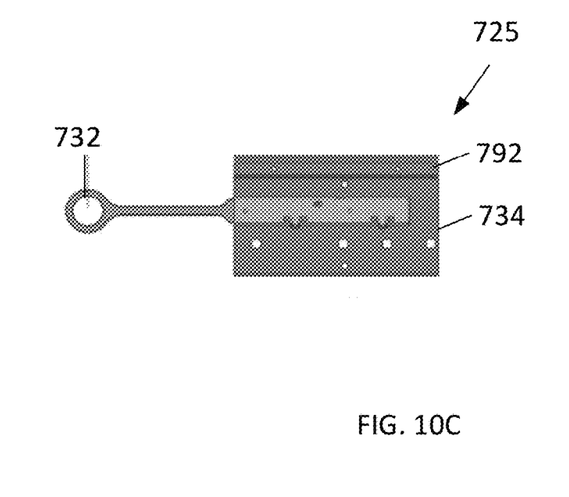

FIG. 10A-10C depicts a top view, a perspective front view and a side view of the sliding tray 725 that may be mounted in the fiber optic panel assembly 700. The sliding tray 725 includes the plurality of protruding structures 742 extending outwardly from the housing 734. A plurality of apertures 798 are defined between the protruding structures 742. The pull tab 732 is attached to a side of the housing 734. A guiding rail 792 is formed on the edges of the housing 734 configured to engage with the tray channel 780 in the mounting bracket 736, when the sliding tray 725 is mounted in the fiber optic panel assembly 700. A mounting feature 790 is formed on the protruding structures 742 that allows the catch 414, 416, as shown in FIG. 4, from the fiber optic module 350 to engage with the mounting feature 790 so as to secure the fiber optic module 350 in the sliding tray 725. In this regard, the apertures 798 defined between the protruding structures 742 are configured to receive another set of the fiber optic module 350 that are not actuatable or slidable by the sliding tray 725. Accordingly, the sliding tray 725 is configured to selectively pull out a predetermined set of the fiber optic module 350 while another set of the fiber optic module 350 not mounted in the sliding tray 725 remained intact without movement. In one example, the protruding structures 742 may have a width similar to, or slightly larger than, the width of the fiber optic module 350 so as to receive the fiber optic module 350 under the protruding structures 742 in the sliding tray 725. In one example, the housing 734 and the protruding structures 742 of the sliding tray 725 may be formed as a unitary body that allows the pull tab 732 to be removably attached to the side of the sliding tray 725.

Figure 11:
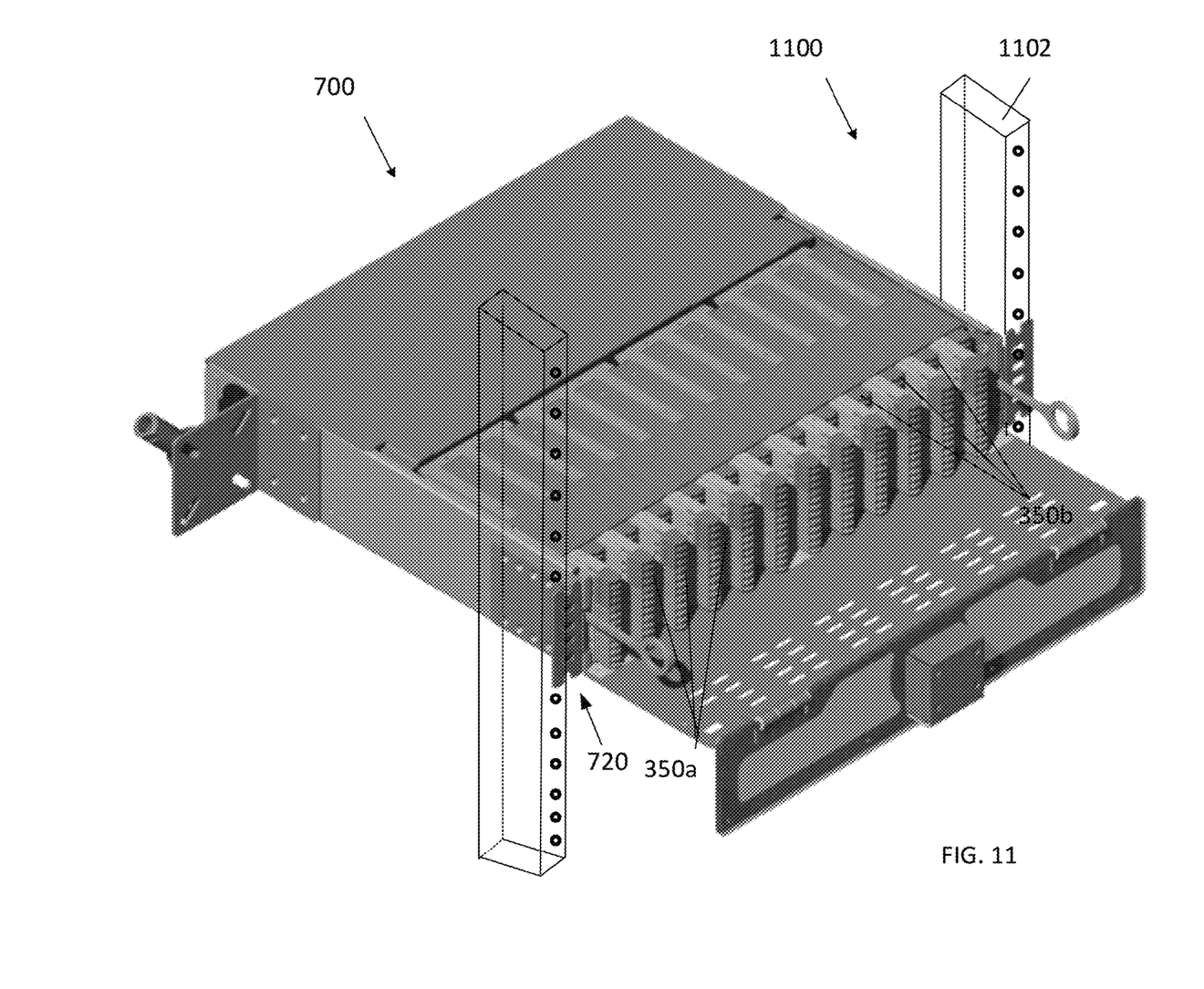
FIG. 11 depict an example fiber optic cable management system that my have the fiber optic panel assembly of FIG. 7 mounted therein according to aspects of the disclosure.

FIG. 11 depict an example fiber optic cable management system 1100 that my have the fiber optic panel assembly 700 of FIG. 7 mounted on a rack 1102. After the first and the second set of the fiber optic module 350a, 350b are disposed in the fiber optic panel assembly 700, the fiber optic panel assembly 700 may then be mounted on the rack 1102 by a fastening features, such as bolts, nuts or fastening screws. The rack 1102 may allow multiple fiber optic panel assembly 700 mounted thereon in the fiber optic cable management system.

Thus, a fiber optic panel assembly that has a sliding tray disposed therein that can slide out certain selected fiber optic modules outward from other non-selected fiber optic modules is provided. Each fiber optic module is disposed vertically side by side in a multiple array configuration in the fiber optic panel assembly. In one example, every other fiber optic module, such as a first set of fiber optic modules, is staggered in a longitudinal direction from a front end to a rear end of the fiber optic module, with respect to an adjacent fiber optic module, such as a second set of fiber optic module. Furthermore, the tray is also configured to pull out multiple selected fiber optic module simultaneously at one time so that a technician or an operator may visually identify and locate the target connector or cable in the fiber optic module assembly efficiently and quickly with minimum search time. As the fiber optic modules are vertically disposed side by side in a closely packed arrangement, good utilization of the space defined in the fiber optic module assembly may be obtained. Thus, the fiber optic module assembly disclosed herein provides high density, ease and quick of access, and a small footprint for the desired cable and connector management and organization.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A fiber optic panel assembly, comprising:
a ceiling, a bottom cover, and two opposing sides defining an interior opening therein;
a mounting bracket disposed on the bottom cover in the interior opening, the mounting bracket comprising a plurality of protruding posts extending outward from a supporting structure of the mounting bracket; and
a sliding tray having a plurality of protruding structures, each protruding structure having a tip end configured to engage with an inner surface of the supporting structure; and
a plurality of apertures defined between the plurality of protruding structures of the sliding tray, wherein the apertures are configured to receive the protruding posts of the mounting bracket.

2. The fiber optic panel assembly of claim 1, wherein the mounting bracket further comprises:
a plurality of apertures defined between the plurality of protruding posts, wherein the apertures are configured to receive the protruding structures of the sliding tray therein.

3. The fiber optic panel assembly of claim 1, wherein each of the plurality of protruding structures of the sliding tray is configured to engage with a fiber optic module.

4. The fiber optic panel assembly of claim 3, wherein each of the plurality of protruding structures of the sliding tray comprises a mounting feature configured to secure the fiber optic module engaged therewith.

5. The fiber optic panel assembly of claim 1, wherein each of the protruding structures of the sliding tray is configured to abut against and interleaved with the respective protruding post from the mounting bracket.

6. The fiber optic panel assembly of claim 1, wherein the sliding tray further comprises:
a guiding rail formed at edges of the sliding tray.

7. The fiber optic panel assembly of claim 1, wherein the mounting bracket further comprises:
 a tray channel formed in the protruding post configured to engage with the guiding rail from the sliding tray.

8. The fiber optic panel assembly of claim 1, wherein the sliding tray further comprises:
 a pull tab formed on a side of the sliding tray.

9. The fiber optic panel assembly of claim 8, wherein the tray channel formed in the protruding post further comprises:
 a stop member disposed in the tray channel.

10. The fiber optic panel assembly of claim 1, wherein each of the plurality of protruding posts of the mounting bracket is configured to engage with a fiber optic module.

11. The fiber optic panel assembly of claim 1, wherein the ceiling further comprises:
 a front top cover and a rear top cover defining the ceiling.

12. The fiber optic panel assembly of claim 1, further comprises:
 a plurality of fiber optic modules configured to engage with the protruding posts and the protruding structures, wherein the fiber optic modules are vertically disposed in the interior opening in an array configuration.

13. The fiber optic panel assembly of claim 1, wherein each of the fiber optic module is configured to have adaptors vertically stacked therein.

14. The fiber optic panel assembly of claim 1, wherein the adaptors are dual polarity adaptors.

15. A fiber optic panel assembly, comprising:
 a ceiling, a bottom cover, and two opposing sides defining an interior opening therein; and
 a sliding tray disposed in the interior opening, the slidable tray configured to have a plurality of fiber optic modules vertically disposed in the sliding tray, wherein the sliding tray is configured to pull out selected fiber optic modules while maintaining non-selected fiber optic modules unmoved, wherein every other fiber optic module is staggered with respect to an adjacent fiber optic module disposed in the interior opening and the sliding tray is configured to provide a relative movement between the fiber optic module and the respective adjacent staggering fiber optic module disposed in the interior opening.

16. The fiber optic panel assembly of claim 15 further comprising:
 a pull tab attached to a side of the sliding tray.

17. The fiber optic panel assembly of claim 15, wherein the selected fiber optic modules is engaged with the sliding tray and the non-selected fiber optic modules is engaged with a mounting bracket disposed in the interior opening.

18. A cable management system, comprising:
 a fiber optic panel assembly disposed in a cable management system, wherein the fiber optic panel assembly further comprises:
  a sliding tray disposed in an interior opening of the fiber optic panel assembly, the slidable tray configured to have a plurality of fiber optic modules vertically disposed in the sliding tray, wherein the sliding tray is configured to pull out selected fiber optic modules while maintaining non-selected fiber optic modules unmoved, wherein every other fiber optic module is staggered with respect to an adjacent fiber optic module disposed in the interior opening and the sliding tray is configured to provide a relative movement between the fiber optic module and the respective adjacent staggering fiber optic module disposed in the interior opening.

19. The cable management system of claim 18, wherein the fiber optic panel assembly is mounted on a rack in the cable management system.

\* \* \* \* \*